United States Patent [19]

D'Aquin

[11] 3,959,507
[45] May 25, 1976

[54] CHEMICAL TREATMENT TO SOFTEN THE BONES OF SMALL FISH FOR EDIBLE PURPOSES

[76] Inventor: Esler L. D'Aquin, 6224 Milne St., New Orleans, La. 70124

[22] Filed: Oct. 2, 1970

[21] Appl. No.: 77,700

[52] U.S. Cl. .............................................. 426/643
[51] Int. Cl.² ......................................... A22C 25/00
[58] Field of Search .................................. 426/642

[56] References Cited
UNITED STATES PATENTS

| | | | |
|---|---|---|---|
| 1,046,991 | 12/1912 | Davilevsky | 426/332 |
| 3,346,395 | 10/1967 | D'Aquin | 426/2 |
| R4,714 | 1/1872 | Herron | 426/129 |

*Primary Examiner*—Raymond N. Jones

[57] ABSTRACT

Subject invention provides a simple and inexpensive chemical process for softening the dangerous spines and the small chest bones which radiate from the backbone of small fish, particularly the catfish. This is accomplished by soaking the pre-gutted and prescaled fish in an aqueous solution of Hydrochloric Acid at temperatures below about 100° Fahrenheit until the spines and chest bones become acceptably soft. The acid treatment renders the chest bones sufficiently soft and without adversely affecting the quality and palatability of the meat.

3 Claims, No Drawings

CHEMICAL TREATMENT TO SOFTEN THE BONES OF SMALL FISH FOR EDIBLE PURPOSES

This invention relates to a process for the in situ softening of certain external and internal bones of small fish. More particularly, it provides a novel and economically feasible chemical process for treating fish to improve their acceptability to processors and also the consuming public.

The process provided herein is especially applicable to the Blue Catfish (*Ictalurus furcatus*) and the Channel Catfish (*Ictalurus punctatus*). These species are most prevalent in rivers, and are being produced in increasingly large tonnages by fish farms. The process is also equally applicable to other small fish.

It is a very well recognized fact by sport and commercial fishermen since the dawn of civilization, that the catfish is extremely dangerous to handle because of the hazard of getting stuck or stung by one of the three pointy bony fins, termed spines, which stick out from its body. There are three such spines, and all are about 1 to 1 ¾ inch in length for a fish about 17 inches long and weighing about 2 pounds. One is the dorsal spine located on the back, just behing the head. The other two, the pectoral spines, are located one on each side of the lower jaw. A typical spine is serrated with numerous needle-point sharp barbs which make it difficult to remove after it has punctured the skin and flesh.

It has been recognized through the years that if an easy means could be found to inactivate these spines such as by mechanically removing them, or better yet, if they could be softened or dissolved by some themical treatment, it would be a signal contribution to this fishery as well as to processors, market clerks, and others who have to handle the fish in order to behead, dress, filet and skin them for edible use. The spines are venemous, and many persons have been hospitalized for treatment after being stuck by one of the spines of even a small fish, and many deaths have occurred. The pain is said to be intense from the inflicted wound, and tetanus antitoxin has to be administered to combat secondary infection.

The catfish is also unique among well known small fish in its skeletal construction in that there is a large number of both long and short bones and/or cartilege located in the thoracic or chest cage section or cavity, and it is rather difficult to cut through or around these hard bones when fileting with a knife in order to free the meat from the backbone of the fish. If some method could be discovered to preferentially soften most of these internal bones sufficiently or totally, such as by treatment with chemicals or the like, not only would the fileting operation be simplified and made easy to perform (especially in the presence of the sharp spines), but the yield of edible meat or flesh would be significantly increased, the labor required reduced considerably, and the final edible filets after cooking would be relatively or entirely free of the usual objectionable hard bones.

An economically feasible method for softening the chest cage bones and the three spines could indeed prove a big boon financially to the catfish industry, especially since in the last few years this fish has been increasingly gaining in favor and in market price because of its delectable taste. Moreover, the annual catfish harvest has been increasing by leaps and bounds since catfish are being raised in man-made ponds in the Southern States, and it is estimated that about 28 million pounds were produced in 1969, with a predicted harvest of about 80 million pounds for 1970, which figure is close to the present annual harvest of shrimp in the Gulf Coast area.

I have discovered that when a gutted catfish is allowed to soak in an aqueous solution containing about 10% by weight of 20 Beaume Hydrochloric acid at normal room temperature for an extended period, the three spines gradually soften, starting at the pointy end, and continue to soften progressively until the spines are entirely soft.

I have also discovered that when the fish was removed from the soaking bath after about 4 to 5 hours, that it could be fileted very easily with a knife, and upon closer examination, it was apparent that the many and various bones in the chest section of the fish had become thoroughly softened such that the knife cut could be made very close to the backbone of the fish to yield thicker filets. It was then observed that the absorbed acid in the flesh of the fish could be completely neutralized by soaking the fish for from 1 to 2 hours in an aqueous solution of sodium carbonate, and that the flesh of the filets after the neutralization appeared to be practically unaffected by the two chemical treatments, and was similar in appearance and firmness to that of untreated fresh fish. The skinned filets were breaded and fried in deep fat in the usual manner, along with filets prepared from untreated fresh fish. It was observed that the cooked filets were closely comparable as to palatability, texture, etc., and that the treated filets had the advantage of being practically free of hard bones.

It was deemed necessary at the outset to conduct a brief study of the skeleton of a typical catfish to determine the number, size, thickness and arrangement of the various bones which needed to be softened. This was done by cooking several types and sizes of catfish in boiling water for about 15 minutes in order to soften the flesh so that it could be easily removed to expose all of the bones of the thoracic section for careful scrutiny.

The chest cage section of the catfish is located immediately back of the head and under the dorsal fin, and, for the average size fish of 12 to 17 inches in length, extends about 3 to 5 inches, starting from the head and in the direction of the tail of the fish. The chest cage section contains two sets of bones which have to be softened. One set comprises a number of segments (not vertebrae) of the backone, They are integral with the backbone, but unlike the remainder of the backbone, the bones of which run up and down, they curve out sidewards on each side of the backbone. They are thick bones are up to about ½ inch in length. The other set of cage bones are the long rib bones or ribs. These are not truly integral with the backbone, but they start at the backbone on either side, and are held firmly in place by meat and cartilege. They curve out and downwards until they almost reach the skin of the fish, where their ends are easily visible under the skin. They are not as thick as the first set of bones but are quite long, measuring about 1 ½ to 2 incher or more. There are about 10 of these rib bones on each side of the fish.

Following the discovery that the spines and chest cage bones could be satisfactorily softened within a reasonably short time by treatment with Hydrochloric acid, a systemmatic study was conducted to investigate each of the important variables involved. Overall objective was to explore the effectiveness of various organic and inorganic acids in treating bony fish, particularly catfish in the popular market sizes of up to about 2 pounds in weight, by soaking them in aqueous solutions of these acids at various tmeperatures and at various acid concentrations, for a sufficient time to: (1) Soften the external spine bones or fins sufficiently so that the fish can be handled safely during the operations of beheading, fileting and deskinning; (2) By continuing the treatment, to soften the internal bones of the chest cage sufficiently to enable cutting through them with a knife without difficulty; (3) By further treatment to soften the internal bones of the chest cage more thoroughly until they approach in softness the bones familiarly present in canned fish products such as salmon and mackeral; 4) To accomplish the above with minimum detrimental effect on the overall quality of the flesh for edible purposes as judged by texture, flavor, odor, color, and other organileptic criteria; (5) To explore application of the subject process for softening the chest bones of other well known market or pan fish such as Trout, Bass, Croakers, Mullets, and the like; 6) To design and develop a practical process for commercial use.

In carrying out the subject invention with catfish, the typical procedure used in most of the experiments was as follow: The fish were first gutted to remove the viscera or entrails. This step is important as it enables the acid solution to penetrate more easily and directly to the chest bones, since the skin was found to rather strongly resist penetration of the acid solution. Four or more fish were gutted and were immersed in an excess of an aqueous solution of an acid for a selected concentration. The bath was maintained at a selected temperature. The soaking was contained until the pointy tips of the three spines became softened for about ⅛ inch. This amount of softening is considered sufficient to insure protection to the operator from being stuck or injured during handling. The time required to accomplish this was recorded.

After the spines were sufficiently softened, the soaking was continued to determine the time required to soften the chest bones. This was done by removing one of the fish from the bath periodically every 30 or 60 minutes, as determined by experience gained in preliminary tests. It was then rinsed with water to remove surface acid. The rinsed fish was then immersed in a bath containing an excess of a solution of about 3% by weight of sodium carbonate in water in order to neutralize the residual acid contained on and in the flesh of the fish. Soaking periods of up to 2 ½ hours were required to effect complete neutralization of the acid as determined with methyl orange indicator, and by taste.

After neutralization, each fish was fileted to test for degree of bone softening. Here a knife was used in the customary manner to cut away the two large filets or segments of flesh from the backbone and head, i.e. one from each side of the fish. The degree of softening of the chest bones could be easily determined by noting the difficulty encountered in running the knife blade through the chest bones as close to the backbone as possible, and also by visual and tactile examination.

In all of the experiments the first fish was removed from the bath for testing after about two hours of soaking had elapsed, at which time the chest bones had usually not softened quite sufficiently. The remaining fish were allowed to continue soaking for another 30 or 60 minutes, at which time a second fish was removed from the bath for examination as above. This operation was repeated until the chest bones were judged to be soft enough such that in fileting, the knife could cut through easily, even though some of the long rib bones were still fairly hard. After this point was reached, the remaining fish were allowed to continue soaking for about 60 to 90 minutes longer, at which time the chest bones had become completely softened. At each reading, data was recorded as to total soaking time, extent of bone softening, and firmness and appearance of the flesh after fileting.

Employing the above procedure, it was possible to judge within about 15 minutes the time taken to soften the spines; and it was possible to judge within about 30 minutes the soaking times required to accomplish partial softening, and to accomplish complete softening of the chest bones. The above procedure is typical of that used in each experiment in which 4 or more fish were processed with a specific acid at a specific acid concentration and at a specific bath temperature.

It is pointed out here that in processing catfish by this invention, the steps of gutting, agitating the soaking baths, neutralization, rinsing, skinning, and fileting are only routine operations which are well known to anyone skilled in the art, and are not to be considered as requiring skill or inventiveness. It is the step of treating the fish in acid solution and at the different temperatures that is considered the inventive step of this process.

A large number of bench-scale experiments were conducted to determine the optimum processing conditions for softening the spines and the chest bones of catfish, and for softening the chest bones of other fish. Various organic and inorganic acids were tried. Organic acids evaluated were U. S. P. grades of Lactic, Citric, Phosphoric, and Acetic Acids. Inorganic acids tried were technical grades of Hydrochloric and Sulphuric Acids. However, it was established early in the study that of all the acids tried, Hydrochloric Acid was the only acid that was capable of softening the spines of catfish, and of softening the chestbones of catfish and other fish. None of the other acids caused any measurable softening even under severe conditions of high acid concentration coupled with high temperature.

To suitable explore the effectiveness of acid concentration, 4 different concentrations were evaluated. They were 5, 10, 20, and 30% by weight of 20° Beaume Hydrochloric Acid.

To suitably explore the effectiveness of treatment temperature, 5 different temperatures were evaluated at each of the above concentrations. They were 40°, 60°, 80°, 100° and 110° Fahrenheit. The limits or ranges for both concentration and temperature had been predetermined approximately in preliminary screening experiments which had indicated that temperatures below 40 degrees Fahrenheit and concentrations below 5% took too long to be effective, that concentrations above 30% were impractically high, and that temperatures above 100° Fahrenheit were impractical in that they caused excessive softening of the flesh of the fish. The experiments were designed to also establish conditions of least severity, minimum complexity, and lowest investment and operating expenses, consistent with acceptable product quality.

The catfish used in this study were fresh Blue and Channel catfish caught in the Mississippi River. Pond-raised fish were not easily available, however it is believed most likelythat they would respond equally as well to the acid treatments. Particular care was exercised to procure only fish that had been freshly harvested. The fish were immediately stored under refrigeration at 42° Fahrenheit. It was noted that catfish stored very well under refrigeration up to 4 or 5 days; however, no fish were used in this study that had been stored under refrigeration for more than 3 days. Sizes of the catfish ranged between 12 inches (about 1 pound) and about 17 inches in length (about 2 pounds). Other fishes processed were fresh and brackish water fish such as croakers, trout, bass and mullets, all in sizes up to 2 pounds, and all of which are known to contain objectionable hard bones.

The following Examples and Table are presented to illustrate in essential detail the important features involved in the practice of the subject invention for softening the spines and chest bones of catfish, and for softening the chest bones of other fish. However, as it is obvious that numerous variations can be made in the practice of the subject invention, the scope of the invention is defined by the claims, and is not to be construed as being limited to any particular type of fish, and to the specific processing conditions disclosed herein.

EXAMPLE 1

Treatment of Catfish with Aqueous Hydrochloric Acid
(Table 1)

Catfish of sizes 1 to 2 pounds were gutted and were subjected to a series of soaking experiments in which the acid concentration in the soaking bath and the temperature of the soaking bath were varied within the limits shown in Table 1. The acid employed was technical grade 20° Beaume Hydrochloric Acid. Acid concentrations used were 5, 10, 20 and 30% by weight, which are equivalent to about from 1.57 to 9.42% by weight of dissolved hydrogen chloride. Bath temperatures employed were 40°, 60°, 80°, 100°, and 110° Fahrenheit. Bath temperatures were controlled within about 1° Fahrenheit. It is noted here that no data are given for intermediate temperature levels, as it is obvious from the results that the process can be operated successfully at any specific temperature between 40 and about 110°. The same reasoning applies to acid concentration levels between 5 and 30%.

In each experiment, the gutted fish were held submerged in the bath until the top ⅛ inch of the spine became acceptably soft. The time required to accomplish this in each experiment is given in Column A in the Table. The treatment was continued until the chest bones softened sufficiently so that the fish could be fileted relatively easily by cutting through the chestbones with a knife. In each case, the degree of softening was determined after the previously described neutralization step, both by fileting and by tactile examination. The time required in each experiment to accomplish partial or incomplete softening of the chest bones is given in Column B. Treatment was continued further until the chest bones were completely softened. Here again, the degree of softening was determined after the neutralization step by both fileting and by tactile examination. The time required to accomplish this in each experiment is given in Column C. Quality evaluation of the flesh of the final filets was noted in each case, and is recorded in the Table.

Data in the table show that the spines of catfish become acceptably soft long before the chest bones soften, and that the time required varied from 180 minutes at 40° Fahrenheit and 10% acid concentration to about 40 minutes at 100° Fahrenheit and 30% acid concentration, and also at 110° Fahrenheit and 20% acid concentration. However, it is noted that the use of temperatures above about 100° Fahrenheit caused objectionable softening of the flesh. The shorter time required to soften the spines acceptably without adversely affecting the flesh quality was 60 minutes. This was achieved by using a soaking temperature of 80° Fahrenheit and an acid concentratof 10 to 30%.

The results in Column C show that the chest bones of catfish can be completely softened in about from 480 to 180 minutes, by employing temperatures between about 40° and 100° Fahrenheit, and acid concentrations between about 10 and 30%, and that the time required depends upon the temperature and the acid concentration. Column B shows that partial softening can be achieved in a shorter time in all cases, should it be desirable to process the fish just long enough to permit easy fileting, even though the chest bones would not be completely softened.

As regards quality of the flesh, the results show that when catfish are processed at 40° and up to about 100° Fahrenheit, the quality of the flesh of the end product filets is practically unchanged from that of an untreated fish from standpoints of texture, color, firmness, etc. As regards firmness, it can be definitely stated stated that the treatment with Hydrochloric acid actually enhances the firmness of the flesh. Several of the end product filets were skinned, breaded and fried. These were taste tested along with fried filets from untreated fresh fish and were found to compare favorably as to palatability, texture, etc. Moreover, the filets from the treated fish would be considered superior because of the virtual absence of hard bones, and also because filets prepared by my process from the same size fish were thicker due to the increased yield of meat over that presently realized in the industry by cutting around the chest and rib bones in order to reduce the amount of bones in the filets. Also noted is the fact that treatment times up to as long as about 9 hours duration even at temperatures up to 80° Fahrenheit had no perceptible adverse effect on flesh quality due to autolysis or other biologic processes.

For the softening of the spines of catfish by my process with Hydrochloric acid when using a soaking temperature of about from 40 to 100 degrees Fahrenheit, I prefer to use an acid concentration of about from 3.14 to 9.42% of hydrogen chloride by weight, and a soaking time of about from about 180 to 60 minutes; the longer times being required for the lower temperatures and the lower acid concentrations.

For the softening of the chest bones of catfish by my process with Hydrochloric acid when using a soaking temperature of about from 40° to 100° Fahrenheit, I prefer to use an acid concentration of about from 3.14 to 9.42% of hydrogen chloride by weight, and a soaking time of from about 480 to 210 minutes; the longer times being required for the lower temperatures and the lower acid concentrations.

EXAMPLE 2

Treatment of Other Fish with Hydrochloric Acid.

As part of this study, tests were conducted to observe if the subject invention would be applicable to the softening of the chest bones of various other well known pan fish, all of which contain an objectionable number of bones in the chest cavity. The fish selected were as follows: Croakers (*Micropogon undulatus*), Speckled Trout (*Eriscion nebulosus*), Striped Bass (*Roccus saxatilis*), Channel Mullets (*Menticirrhus americanus*), Striped Mullets (*Mugil cephalus*), Black Bass (*Huro floridana*). It is noted here that none of the above fish have spines like the catfish, and unlike the catfish, all have scales. Sizes used were between 1 and two pounds in weight such as are usually available in retail fish markets. Before beginning the study, one of each of the above fishes was carefully dissected to observe the internal bones as to location, size, thickness, number, and hardness.

Preliminary experiments were carried out with each of the above-named fish, and the results were equally as successful as the results obtained with catfish as shown in Table 1. As an example, 4 of each of the fish types were processed using an 80° Fahrenheit treatment temperature and an acid concentration of 20% of 20° Beaume Hydrochloric acid by weight. The fish were gutted and scaled and were treated in the acid bath for about 250 minutes. They were removed from the bath, neutralized with sodium carbonate solution and were then fileted. The filets contained no hard bones. In fact, the few bones that were detectable had been converted to soft cartilege. The filets were battered and fried, and the texture and flavor of the meat was comparable to that of filets prepared from the untreated fish. Next, the catfish should be closely applicable to the processing of other fish.

For the softening of the chestbones of small fish such as croakers, trout, bass and mullets and the like by my process when using a soaking temperature of about from 40 to 100° Fahrenheit, I prefer to use an acid concentration of about from 3.14 to 9.42% of hydrogen chloride by weight, and a soaking time of about from 480 to 210 minutes; the longer times being required for the lower temperatures and lower acid concentrations.

As it is apparent from the foregoing that the soaking time to achieve acceptable softening of the spines of catfish and of the chestbones of catfish and other fish is dependent upon the treating temperature and the acid concentration, the subject invention for processing catfish of sizes up to about 2 pounds in weight can be successfully carried out by using the data in the table as a guide, and simply to soak the gutted fish in the acid bath until the spines are sufficiently softened, and to continue the soaking until the chest bones are sufficiently softened. And it is apparent that the subject invention for processing other fish that have no spines and are of sizes up to about 2 pounds, can be successfully carried out by using the data in the table as a guide, and simply to soak the scaled and gutted fish in the acid bath until the chest bones are sufficiently softened. This should offer no difficulty to anyone skilled in the art.

Table 1

| Soaking Temp., Degrees F. | Treatment of Catfish with Aqueous Hydrochloric Acid. | | | | | | | |
|---|---|---|---|---|---|---|---|---|
| | Acid Concentrat. Weight Percent | | Soaking Period, Mins. | | | Quality of Flesh After Processing | | |
| | 20°Be. Acid (1) | Hydrogen Chloride (2) | Spines A (3) | Chest B (4) | Bones C (5) | Good | Fair | Poor |
| 40 | 5 | 1.57 | — | — | — | — | — | — |
| 40 | 10 | 3.14 | 180 | 360 | 480 | Yes | — | — |
| 40 | 20 | 6.28 | 150 | 330 | 390 | Yes | — | — |
| 40 | 30 | 9.42 | 120 | 240 | 330 | Yes | — | — |
| 60 | 5 | 1.57 | 120 | 480 | 570 | Yes | — | — |
| 60 | 10 | 3.14 | 100 | 180 | 300 | Yes | — | — |
| 60 | 20 | 6.28 | 90 | 180 | 270 | Yes | — | — |
| 60 | 30 | 9.42 | 90 | 180 | 240 | Yes | — | — |
| 80 | 5 | 1.57 | 110 | 420 | 510 | Yes | — | — |
| 80 | 10 | 3.14 | 60 | 240 | 330 | Yes | — | — |
| 80 | 20 | 6.28 | 65 | 170 | 240 | Yes | — | — |
| 80 | 30 | 9.42 | 60 | 170 | 210 | — | Yes | — |
| 100 | 5 | 1.57 | 90 | 300 | 390 | — | Yes | — |
| 100 | 10 | 3.14 | 80 | 210 | 300 | — | — | Yes |
| 100 | 20 | 6.28 | 50 | 150 | 210 | — | — | Yes |
| 100 | 30 | 9.42 | 40 | 130 | 180 | — | — | Yes |
| 110 | 20 | 6.28 | 40 | 130 | 170 | — | — | Yes |

(1) 20°Be. Acid contains 31.4% Hydrogen Chloride.
(2) Equivalent percentage by weight of Hydrogen Chloride.
(3) Column A lists approximate times required to soften top ⅛ inch of spines to enable safe handling of fish.
(4) Column B lists approximate average times required to soften chest bones sufficiently so that knife cuts through easily for fileting.
(5) Column C lists approximate average times required to completely soften chest bones.

above series of experiments was repeated using a treatment temperature of 60° Fahrenheit, the same acid concentration, and a treatment time of about 260 minutes. The results were closely comparable with that of the first series in which the 80° treatment temperature was used.

The above data show it can be reasonably assumed that other small fish respond similarly to catfish to the acid treatment, and that for all practical purposes the operating conditions and results shown in Table 1 for

I claim:
1. A process for softening the sharp tips of the spines of catfish which consists of soaking gutted catfish in an aqueous solution containing from about 3.14% to 9.42% of hydrogen chloride by weight, at a temperature of from about 40° Fahrenheit to about 80° Fahrenheit for a period of from about 60 minutes to 180 minutes, and thereafter neutralizing the acid soaked catfish using aqueous sodium carbonate.

2. A process for softening both the tips of the spines and the chest bones of catfish to produce catfish for edible purposes which process consists of soaking gutted catfish in an aqueous solution containing from about 3.14% to 9.42% of hydrogen chloride by weight, at a temperature of from about 40° Fahrenheit to about 80° Fahrenheit for a period of from about 210 minutes to 480 minutes, and thereafter neutralizing the acid soaked catfish using aqueous sodium carbonate.

3. A process for softening the chest bones of edible fish which process consists of soaking scaled and gutted fish in an aqueous solution containing from about 3.14% to 9.42% of hydrogen chloride by weight, at a temperature of from about 40° Fahrenheit to about 80° Fahrenheit for a period of from about 210 minutes to 480 minutes, and thereafter neutralizing the acid soaked fish using sodium carbonate.

\* \* \* \* \*